US008616828B2

(12) United States Patent  
Myers et al.

(10) Patent No.: US 8,616,828 B2
(45) Date of Patent: Dec. 31, 2013

(54) ADJUSTABLE LOOP ROTOR AIR COOLER AND FUEL GAS HEATER

(75) Inventors: Gerald A. Myers, Longwood, FL (US); Jason M. Reichow, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 752 days.

(21) Appl. No.: 12/795,793

(22) Filed: Jun. 8, 2010

(65) Prior Publication Data

US 2011/0297357 A1 Dec. 8, 2011

(51) Int. Cl.
*F01D 9/06* (2006.01)
*F01D 5/18* (2006.01)

(52) U.S. Cl.
USPC ........... 415/1; 415/115; 415/116; 416/95; 416/96 R; 454/264; 454/265; 454/319; 454/358

(58) Field of Classification Search
USPC ........... 415/115, 116, 1; 416/95, 96 R, 96 A, 416/97 R, 97 A; 65/265, 267, 319, 356; 454/264, 265, 277, 347, 358
See application file for complete search history.

(56) References Cited

U.S. PATENT DOCUMENTS

| | | | | |
|---|---|---|---|---|
| 5,794,448 | A | * | 8/1998 | Fujioka et al. .................. 60/736 |
| 6,971,377 | B2 | * | 12/2005 | Moyer et al. ............. 123/568.12 |
| 2008/0254735 | A1 | * | 10/2008 | Coward et al. ................ 454/358 |

FOREIGN PATENT DOCUMENTS

| | | |
|---|---|---|
| EP | 0737804 A2 | 3/1996 |
| EP | 1154135 A2 | 11/2001 |
| EP | 2000648 A2 | 6/2008 |
| GB | 2264539 A | 9/1993 |
| GB | 2437295 A | 4/2006 |

* cited by examiner

*Primary Examiner* — Christopher Verdier

(57) ABSTRACT

A cooling system for turbine engines for controlling cooling of rotor cooling air and heating of fuel gas is disclosed. The cooling system may be formed from a housing formed from a main plenum, a rotor air cooler positioned at least partially in the main plenum and a fuel gas heater positioned at least partially in the main plenum downstream from rotor air cooler. The cooling system may include a by-pass plenum for returning used cooling air back to a region upstream of the rotor air cooler. An exhaust fluid control device may control fluid flow out of the first exhaust opening at the second end of the main plenum, and a by-pass fluid control device may control fluid flow into the by-pass inlet opening of the by-pass plenum. The control devices and a fan may control circulation of cooling fluids through the main plenum.

20 Claims, 3 Drawing Sheets

ADJUSTABLE LOOP ROTOR AIR COOLER AND FUEL GAS HEATER

FIELD OF THE INVENTION

This invention is directed generally to turbine engines, and more particularly to turbine engines having cooling systems for passing fluids, such as air, to cool the turbine engine components.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies to these high temperatures. As a result, turbine vanes and blades must be made of materials capable of withstanding such high temperatures. In addition, turbine vanes and blades often contain cooling systems for prolonging the life of the vanes and blades and reducing the likelihood of failure as a result of excessive temperatures. Typically, turbine blades are attached to a rotor assembly. The rotor assembly receives cooling fluids to cool the rotor assembly and to supply those cooling fluids to the turbine blades. While the cooling system cools aspects of the turbine engine, improvements to the system are needed.

SUMMARY OF THE INVENTION

This invention relates to a cooling system for turbine engines for controlling cooling of rotor cooling air and heating of fuel gas. The cooling system may be formed from a housing including a main plenum, a rotor air cooler positioned at least partially in the main plenum and a fuel gas heater positioned at least partially in the main plenum. The cooling system may include a by-pass plenum for returning used cooling air back to a region upstream of the rotor air cooler. An exhaust fluid control device may control fluid flow out of the first exhaust opening at a second end of the main plenum, and a by-pass fluid control device may control fluid flow into a by-pass inlet opening of the by-pass plenum. The control devices and a fan may control circulation of cooling fluids through the main plenum to control the amount of heating of the fuel gas.

The cooling system may include a housing including a support structure and a main plenum with at least a first inlet opening at a first end and a first exhaust opening at a second end. A rotor air cooler may be positioned at least partially in the main plenum between the first and second ends such that cooling fluids may be directed to flow through the plenum and contact the rotor air cooler. The rotor air cooler may be formed from at least one bundle of tubes having a plurality of fins extending radially outward therefrom. The cooling system may include a by-pass plenum having a by-pass inlet opening in the main plenum downstream from the rotor air cooler and a by-pass outlet opening upstream of the rotor air cooler.

The cooling system may include an exhaust fluid control device that controls fluid flow out of the first exhaust opening at the second end of the main plenum. The exhaust fluid control device may include a plurality of louvers rotatably contained therein such that the louvers can rotate between open and closed positions. The cooling system may include a by-pass fluid control device that controls fluid flow into the by-pass inlet opening of the by-pass plenum. The by-pass fluid control device may include a plurality of louvers rotatably contained therein such that the louvers can rotate between open and closed positions.

The cooling system may also include a fuel gas heater positioned at least partially in the main plenum downstream from rotor air cooler. The fuel gas heater may be formed from one or more bundle of tubes. The tubes may include one fin or a plurality of fins extending radially outward therefrom. The fuel gas heater may be formed from at least a first stage of tubes and a second stage of tubes, such that the first and second stages of tubes are coupled together with a fuel gas manifold. Each of the first stage of tubes and the second stage of tubes may have a plurality of fins extending radially outward therefrom.

The cooling system may include a fan for circulating cooling fluids through the main plenum. The cooling system may also include a control module in communication with the exhaust fluid control device and the by-pass fluid control device for controlling operation of the exhaust and by-pass fluid control devices.

An advantage of this invention is that all rotor air coolers can potentially be converted to be utilized for fuel gas heating.

Another advantage of this invention is that the cooling system will function as a rotor air cooler without fuel gas heating.

Yet another advantage of this invention is that there may be no use of hazardous fluids.

Another advantage is that the configuration of the fuel gas heater is fail safe for a fuel into gas leak.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
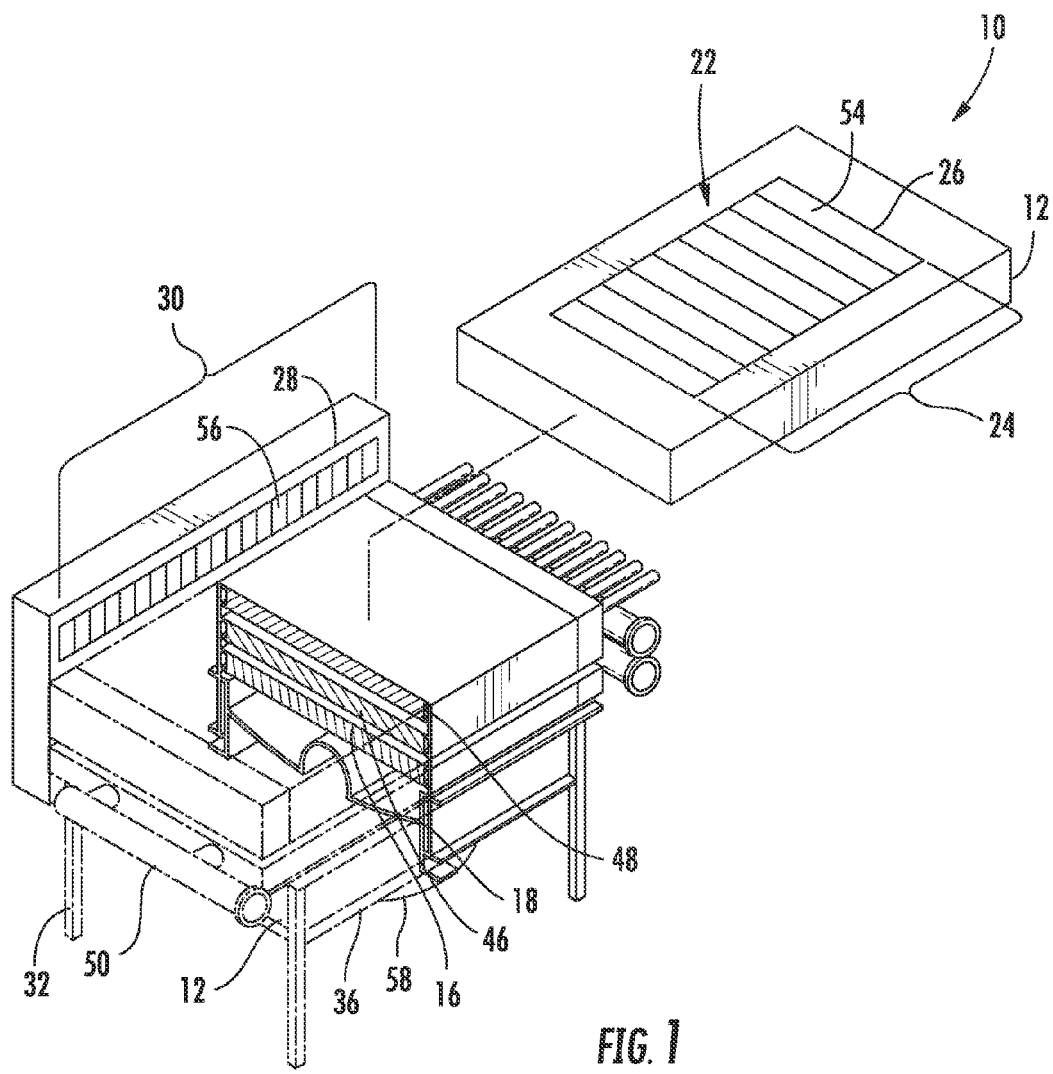
FIG. 1 is an exploded perspective view of a cooling system for cooling rotor air and fuel gas.
Figure 2:
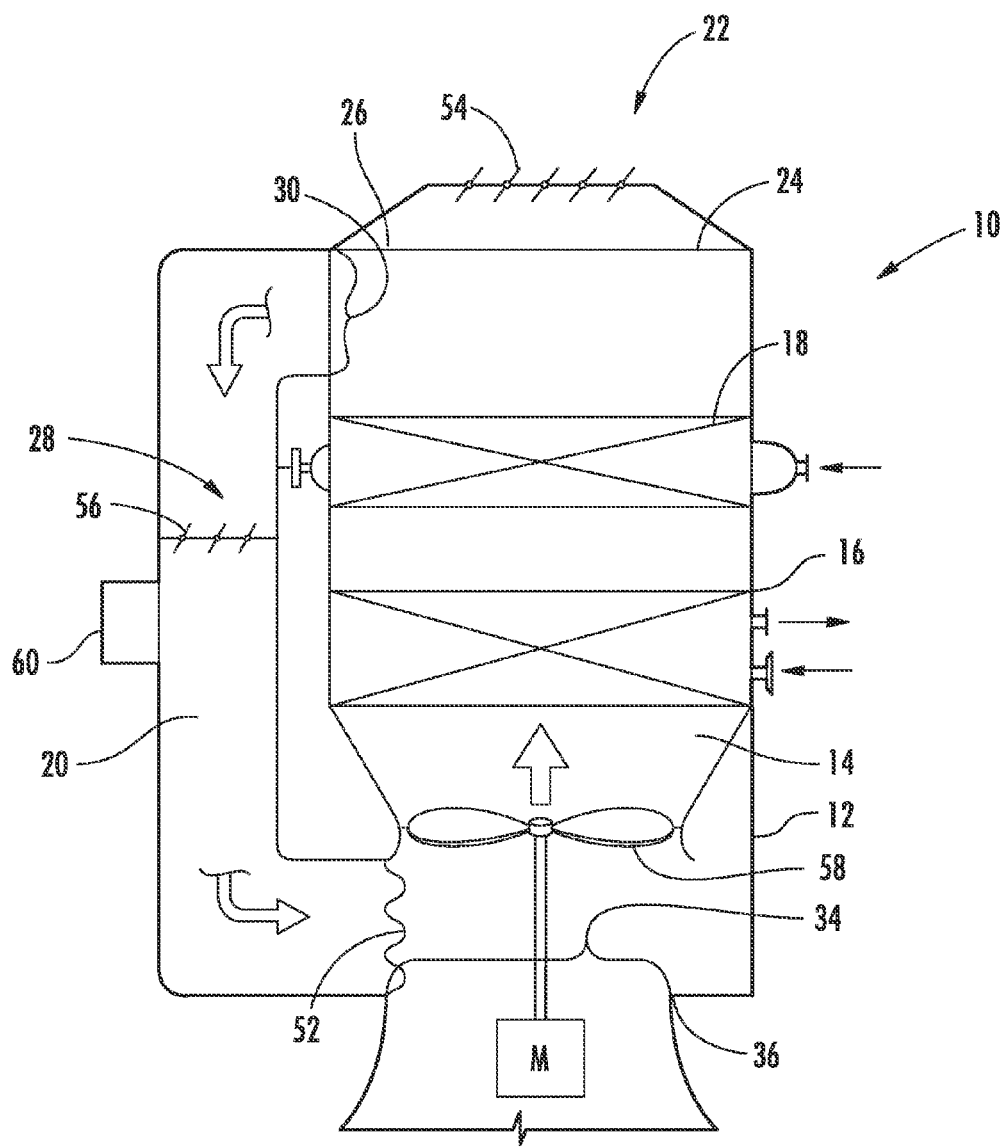
FIG. 2 is a schematic diagram of the system of FIG. 1.
Figure 3:
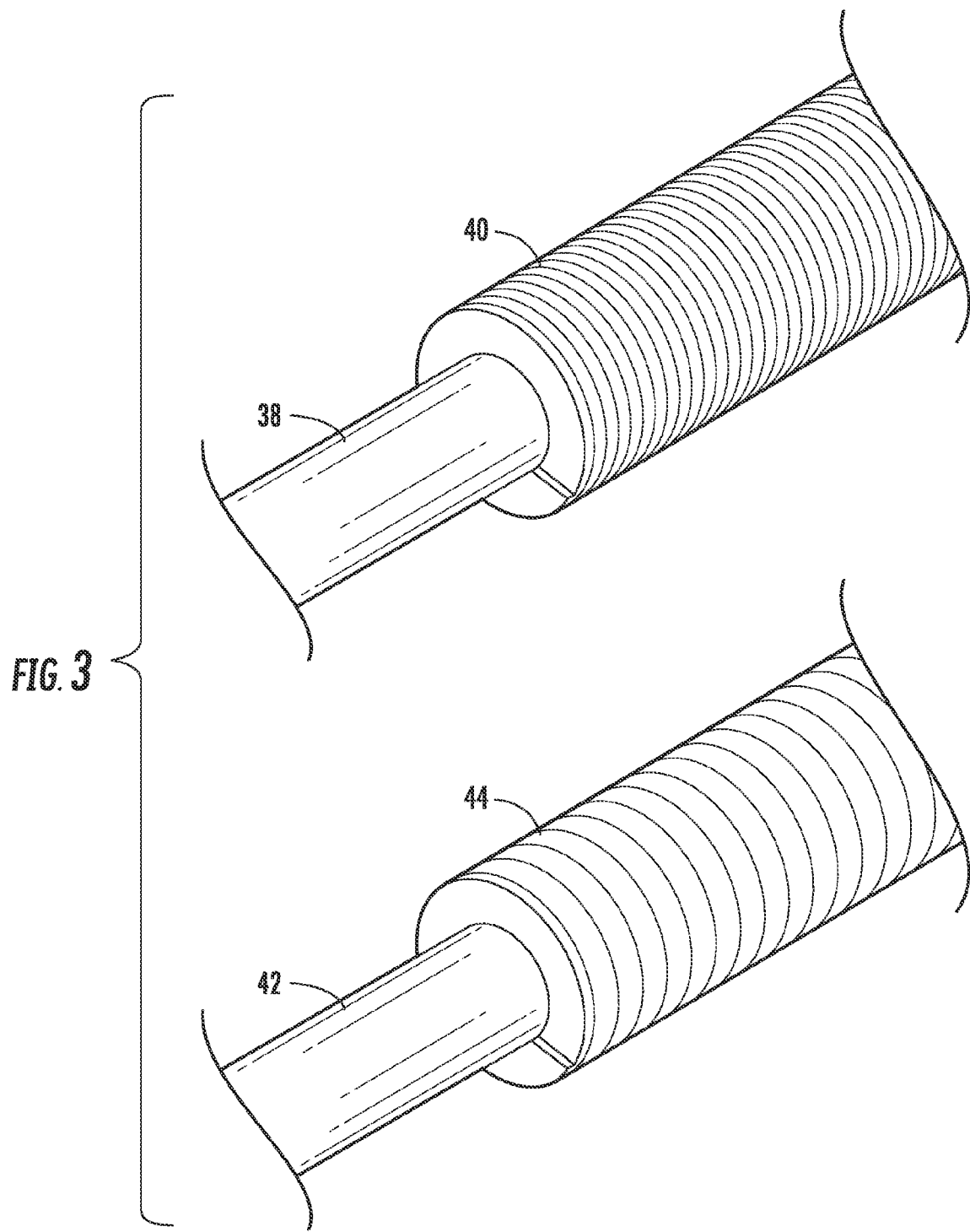
FIG. 3 is a partial perspective view of tubes forming a rotor air cooler and a fuel gas heater of the cooling system.

As shown in FIGS. 1-3, this invention is directed to a cooling system 10 for turbine engines for controlling cooling of rotor cooling air and heating of fuel gas. The cooling system 10 may be formed from a housing 12 including a main plenum 14, a rotor air cooler 16 positioned at least partially in the main plenum 14 and a fuel gas heater 18 positioned at least partially in the main plenum 14. The cooling system 10 may include a by-pass plenum 20 for returning used cooling air back to a region upstream of the rotor air cooler 16. An exhaust fluid control device 22 may control fluid flow out of the first exhaust opening 24 at a second end 26 of the main plenum 14, and a by-pass fluid control device 28 may control fluid flow into a by-pass inlet opening 30 of the by-pass plenum 20. The control devices 22, 28 and a fan 58 may control circulation of cooling fluids through the main plenum 14 to control the amount of heating of the fuel gas.

The housing 12 of the cooling system 10 may include a support structure 32 having any appropriate configuration. The support structure 32 may be integrally formed with the housing 12. The support structure 32 form the main plenum 14. The main plenum 14 may include a first inlet opening 34 at a first end 36 and a first exhaust opening 24 at the second end 26. The second end 26 may be generally opposite from the first end 36. The main plenum 14 may have a generally linear longitudinal axis, as shown in FIG. 1, or may be non-linear in other embodiments. The main plenum 14 may have a cross-section with any appropriate configuration, such as, but not limited to, circular, triangular, rectangular and other shapes.

The cooling system 10 may include a rotor air cooler 16 for cooling fluids used to cool a rotor assembly (not shown) of a turbine engine. The fluids that are cooled may be, but are not limited to, air. The rotor air cooler 16 may be positioned at least partially in the main plenum 14 between the first and second ends 36, 26 such that cooling fluids may be directed to flow through the plenum 14 and contact the rotor air cooler 16. The rotor air cooler 16 may be formed from any cooling structure capable of adequately cooling the rotor cooling fluid. In at least one embodiment, the rotor air cooler 16 may be formed from one or more bundles of tubes 38 having a plurality of fins 40 extending radially outward therefrom. The tubes 38 may be coupled to manifolds upstream and downstream from the tubes 38 to facilitate receiving cooling fluids from a rotor assembly and returning those cooling fluids to the rotor assembly.

The cooling system 10 may include a fuel gas heater 18 for heating fuel gas before use in the turbine engine. The fuel gas heater 18 may be positioned at least partially in the main plenum 14 downstream from rotor air cooler 16. The fuel gas heater 18 may be formed from any cooling structure capable of adequately cooling the rotor cooling fluid. In at least one embodiment, the fuel gas heater 18 may be formed from at least one bundle of tubes 42. One or more of the tubes 42 may include a plurality of fins 44 extending radially outward therefrom. In at least one embodiment, the fuel gas heater 18 may be formed from at least a first stage 46 of tubes and a second stage 48 of tubes, wherein the first and second stages 46, 48 of tubes are coupled together with a fuel gas manifold 50. Each of the first stage 46 of tubes and the second stage 48 of tubes may have a plurality of fins 44 extending radially outward therefrom.

The cooling system 10 may include a by-pass plenum 20 having a by-pass inlet opening 30 in the main plenum 14. The by-pass inlet opening 30 may be positioned downstream from the rotor air cooler 16, and a by-pass outlet opening 52 may be upstream of the rotor air cooler 16. In such configuration, fluids, such as, but not limited to, air, may be recirculated through the main plenum 14 to use the heat contained in those fluids. The by-pass inlet opening 30 and the by-pass outlet opening 52 may have any appropriate configuration such as, but not limited to, circular, triangular, rectangular and other shapes.

The cooling system 10 may include an exhaust fluid control device 22 that controls fluid flow out of the first exhaust opening 24 at the second end 26 of the main plenum 14. In one embodiment, the exhaust fluid control device 22 may include a plurality of louvers 54 rotatably contained therein such that the louvers 54 can rotate between open and closed positions. In one embodiment, the louvers 54 may be formed from a plurality of aligned louvers 54 such that when closed, the entire first exhaust opening 24 is sealed. The louvers 54 may be positioned vertically, horizontally or in any other manner.

The cooling system 10 may include a by-pass fluid control device 28 that controls fluid flow into the by-pass inlet opening 30 of the by-pass plenum 20. In one embodiment, the by-pass fluid control device 28 may include a plurality of louvers 56 rotatably contained therein such that the louvers 56 can rotate between open and closed positions. In one embodiment, the louvers 56 may be formed from a plurality of aligned louvers 56 such that when closed, the by-pass fluid control device 28 is sealed. The louvers 56 may be positioned vertically, horizontally or in any other manner.

The cooling system 10 may include a fan 58 configured to circulate air or other cooling fluids through the main plenum 14. The fan 58 may be positioned in any manner enabling the cooling fluids to be circulated through the main plenum 14. One or more fans 58 may be positioned in the main plenum 14. In at least one embodiment, the fan 58 may be positioned upstream from the rotor air cooler 16 and the fuel gas heater 18, but may be positioned in other locations in other embodiments. The fan 58 may have any appropriate configuration.

A control module 60 may be included to control the fan 58, the exhaust fluid control device 22 and the by-pass fluid control device 28. The control module 60 may include pre-programmed code to control these devices 58, 22 and 28 based upon one or more parameters, such as ambient parameters and turbine engine parameters. The control module 60 may be any appropriate device, such as, but not limited to, a microcontroller and a computer.

The cooling system 10 may be used to control cooling of rotor cooling air and heating of fuel gas. A cooling fluid may be passed through the cooling system 10 described above. In particular, the cooling fluid may be passed into the main plenum 14 where the fluid strikes an outer surface of elements forming the rotor air cooler 16. In particular, the fluid may contact the fins 40 extending from tubes 38 forming the rotor air cooler 16, and rotor cooling air may be passed through the rotor air cooler. The fluid may extract heat from the fins 40 and undergo an increase in temperature before flowing downstream of the rotor air cooler 16. The fluids then may be passed into contact with an outer surface of elements forming the fuel gas heater 18, and fuel gas may be passed through the fuel gas heater 18. In particular, the fluid may contact the fins 44 extending from tubes 42 forming the fuel gas heater 18. The fluids may increase the temperature of the fuel gas flowing through the fuel gas heater 18 by transferring heat from the fluid to the fuel gas in the fuel gas heater 18. The air flowing through the main plenum 14 may then be routed based on the amount of heating of the fuel gas.

The exhaust fluid control device 22 and the by-pass fluid control device 28 may be controlled, thereby controlling heating of the fuel gas flowing through the fuel gas heater. The system 10 may be controlled such that there is no fuel heating by completely opening the exhaust fluid control device, closing the by-pass fluid control device and modulating the fan. In addition, the system 10 may be controlled such that there is full fuel heating by completely closing the exhaust fluid control device, opening the by-pass fluid control device and modulating the fan. The system 10 may be controlled such that there is partial fuel heating by modulating the exhaust fluid control device 22 and closing the by-pass fluid control device 28.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A cooling system for rotor assembly cooling air, comprising:
a housing including a support structure and a main plenum with at least a first inlet opening at a first end and a first exhaust opening at a second end;

a rotor air cooler positioned at least partially in the main plenum between the first and second ends such that cooling fluids are directed to flow through the plenum and contact the rotor air cooler;

a by-pass plenum having a by-pass inlet opening in the main plenum downstream from the rotor air cooler and a by-pass outlet opening upstream of the rotor air cooler;

an exhaust fluid control device that controls fluid flow out of the first exhaust opening at the second end of the main plenum; and a by-pass fluid control device that controls fluid flow into the by-pass inlet opening of the by-pass plenum.

2. The cooling system of claim 1, further comprising a fuel gas heater positioned at least partially in the main plenum downstream from the rotor air cooler.

3. The cooling system of claim 2, wherein the fuel gas heater is formed from at least one bundle of tubes.

4. The cooling system of claim 3, wherein the fuel gas heater is formed from at least one bundle of tubes having a plurality of fins extending radially outward therefrom.

5. The cooling system of claim 3, wherein the fuel gas heater is formed from at least a first stage of tubes and a second stage of tubes, wherein the first and second stages of tubes are coupled together with a fuel gas manifold.

6. The cooling system of claim 5, wherein each of the first stage of tubes and the second stage of tubes has a plurality of fins extending radially outward therefrom.

7. The cooling system of claim 1, wherein the rotor air cooler is formed from at least one bundle of tubes having a plurality of fins extending radially outward therefrom.

8. The cooling system of claim 1, further comprising a fan for circulating cooling fluids through the main plenum.

9. The cooling system of claim 1, wherein the exhaust fluid control device includes a plurality of louvers rotatably contained therein such that the louvers can rotate between open and closed positions.

10. The cooling system of claim 1, wherein the by-pass fluid control device includes a plurality of louvers rotatably contained therein such that the louvers can rotate between open and closed positions.

11. The cooling system of claim 1, further comprising a control module in communication with the exhaust fluid control device and the by-pass fluid control device for controlling operation of the exhaust and by-pass fluid control devices.

12. A cooling system for rotor assembly cooling air, comprising:

a housing including a support structure and a main plenum with at least a first inlet opening at a first end and a first exhaust opening at a second end;

a rotor air cooler positioned at least partially in the main plenum between the first and second ends such that cooling fluids may be directed to flow through the plenum and contact the rotor air cooler;

a fuel gas heater positioned at least partially in the main plenum downstream from the rotor air cooler;

a by-pass plenum having a by-pass inlet opening in the main plenum downstream from the rotor air cooler and a by-pass outlet opening upstream of the rotor air cooler;

an exhaust fluid control device that controls fluid flow out of the first exhaust opening at the second end of the main plenum;

a by-pass fluid control device that controls fluid flow into the by-pass inlet opening of the by-pass plenum; and a fan for circulating cooling fluids through the main plenum.

13. The cooling system of claim 12, wherein the fuel gas heater is formed from at least a first stage of tubes and a second stage of tubes, each having a plurality of fins extending radially outward therefrom, wherein the first and second stages of tubes are coupled together with a fuel gas manifold.

14. The cooling system of claim 12, wherein the rotor air cooler is formed from at least one bundle of tubes having a plurality of fins extending radially outward therefrom.

15. The cooling system of claim 12, wherein the exhaust fluid control device includes a plurality of louvers rotatably contained therein such that the louvers can rotate between open and closed positions, and wherein the by-pass fluid control device includes a plurality of louvers rotatably contained therein such that the louvers can rotate between open and closed positions.

16. The cooling system of claim 12, further comprising a control module in communication with the exhaust fluid control device and the by-pass fluid control device for controlling operation of the exhaust and by-pass fluid control devices.

17. A method of controlling cooling of rotor cooling air and heating of fuel gas, comprising:

passing a cooling fluid through a cooling system, wherein the cooling system comprises:

a housing including a support structure and a main plenum with at least a first inlet opening at a first end and a first exhaust opening at a second end;

a rotor air cooler positioned at least partially in the main plenum between the first and second ends such that cooling fluids may be directed to flow through the plenum and contact the rotor air cooler;

a fuel gas heater positioned at least partially in the main plenum downstream from the rotor air cooler;

a by-pass plenum having a by-pass inlet opening in the main plenum downstream from the rotor air cooler and a by-pass outlet opening upstream of the rotor air cooler;

an exhaust fluid control device that controls fluid flow out of the first exhaust opening at the second end of the main plenum;

a by-pass fluid control device that controls fluid flow into the by-pass inlet opening of the by-pass plenum; and a fan for circulating cooling fluids through the main plenum passing rotor cooling air through the rotor air cooler;

passing fuel gas through the fuel gas heater; and controlling the exhaust fluid control device and the by-pass fluid control device, thereby controlling heating of the fuel gas flowing through the fuel gas heater.

18. The method of claim 17, wherein controlling the exhaust fluid control device and the by-pass fluid control device comprise no fuel heating by opening the exhaust fluid control device, closing the by-pass fluid control device and modulating the fan.

19. The method of claim 17, wherein controlling the exhaust fluid control device and the by-pass fluid control device comprise full fuel heating by closing the exhaust fluid control device, opening the by-pass fluid control device and modulating the fan.

20. The method of claim 17, wherein controlling the exhaust fluid control device and the by-pass fluid control device comprise partial fuel heating by modulating the exhaust fluid control device and closing the by-pass fluid control device.

* * * * *